United States Patent [19]

Seo

[11] Patent Number: 5,748,398

[45] Date of Patent: May 5, 1998

[54] METHOD FOR WRITING SERVO SIGNALS ONTO A MAGNETIC DISK AND MAGNETIC DISK DRIVE EQUIPPED WITH MAGNETIC DISK(S) HAVING SERVO PATTERN RECORDED BY THE METHOD

[75] Inventor: Yosuke Seo, Sagamihara, Japan

[73] Assignee: Hitachi, Ltd., Tokyo, Japan

[21] Appl. No.: 665,531

[22] Filed: Jun. 18, 1996

Related U.S. Application Data

[63] Continuation of Ser. No. 275,373, Jul. 15, 1994, abandoned.

[30] Foreign Application Priority Data

Jul. 21, 1993 [JP] Japan ............... 5-180148

[51] Int. Cl.[6] .................. G11B 5/09; G11B 5/516
[52] U.S. Cl. .............. 360/51; 360/77.08; 360/48
[58] Field of Search .............. 360/48, 51, 77.02, 360/77.05, 77.08, 77.11

[56] References Cited

U.S. PATENT DOCUMENTS 4,531,167 7/1985 Berger .................. 360/77.02

4,980,783 12/1990 Moir et al. .................. 360/77.02
5,193,034 3/1993 Tsuyoshi et al. .................. 360/51
5,339,204 8/1994 James et al. .................. 360/51

FOREIGN PATENT DOCUMENTS

| 0 437 947 | 7/1991 | European Pat. Off. |
| 64-48276 | 2/1989 | Japan . |
| 3-73406 | 3/1991 | Japan . |
| 3-214474 | 9/1991 | Japan . |

*Primary Examiner*—Aristotelis M. Psitos
*Assistant Examiner*—Regina Y. Neal
*Attorney, Agent, or Firm*—Antonelli, Terry, Stout & Kraus, LLP

[57] ABSTRACT

A method for recording servo patterns in a magnetic disk drive and a magnetic disk drive for executing such a method are provided. A magnetic disk on which a clock signal has been recorded in at least a part thereof is mounted into the magnetic disk drive. The clock signal is read out from the magnetic disk by using a data recording/reproducing magnetic head. A servo pattern is further recorded by using the recording/reproducing magnetic head on the basis of the read-out clock signal.

3 Claims, 7 Drawing Sheets

METHOD FOR WRITING SERVO SIGNALS ONTO A MAGNETIC DISK AND MAGNETIC DISK DRIVE EQUIPPED WITH MAGNETIC DISK(S) HAVING SERVO PATTERN RECORDED BY THE METHOD

This application is a continuation application of Ser. No. 08/275,373, filed Jul. 15, 1994, now abandoned.

BACKGROUND OF THE INVENTION

The present invention relates to a method for writing servo signals (patterns), a magnetic disk drive, and a magnetic disk and, more particularly, to a method of writing servo signals, a magnetic disk drive, and a magnetic disk which can record a servo pattern which does not cause a phase deviation among tracks and a decentering to a disk and which can eliminate disadvantages such as limitation on a design of the apparatus, increase in manufacturing costs, and the like which are caused by individually providing a dedicated clock head.

A conventional apparatus (servo track writer) for writing position signals to a magnetic disk drive has been disclosed in JP-A-64-48276. According to such a servo track writer, a magnetic head dedicated to clock is arranged at a specific position in a plurality of stacked disks, a clock signal to produce a clock is written onto a magnetic disk by the dedicated clock head, a clock which is always synchronized with the rotation is generated from the clock signal, and a servo pattern is recorded by a data recording head on the basis of the clock. To record the servo pattern onto the whole surface, the data recording head is moved at a predetermined step, thereby effecting a recording.

Figure 4:
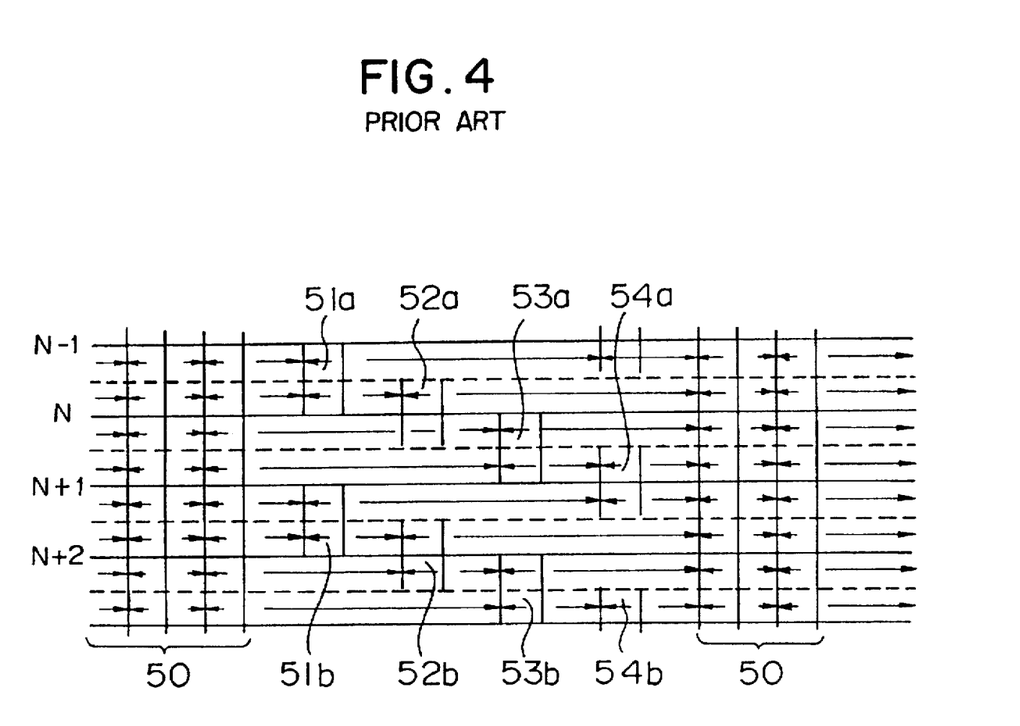
FIG. 4 is a diagram showing an example of a conventional servo pattern.

FIG. 4 is an explanatory diagram showing an example of a servo pattern which is written to the magnetic disk as mentioned above. The servo pattern is constructed by a sync signal (pattern) 50, position signals (patterns) 51a, 51b, 52a, 52b, 53a, 53b, 54a, and 54b, and the like. The sync signal 50, the position signal 51a, and the like are written by moving the data recording head by ½ track at a time every rotation of the track. That is, when the data recording head is located at the position where one end of the recording head coincides with the track (N−1), the position signal 51a is written. Subsequently, when the data recording head is moved by a distance corresponding to ½ track and is located over a track N, the position signal 52a is written. In a manner similar to the above, the position signals 53a, 54a, 51a, and the like are sequentially written each time the head is moved by a distance of ½ track. The sync signal 50 is also obviously sequentially written every ½ track together with those position signal.

Further, a technique that a servo pattern is written onto a magnetic disk in a single disk state and is mounted or loaded into the magnetic disk drive after the servo pattern was written, has been disclosed in JP-A-3-73406.

A method whereby a disk on which a servo pattern and a clock have previously been recorded is loaded into an apparatus and a head is positioned by the recorded servo pattern on the disk and the servo pattern is newly recorded onto each disk surface has also been disclosed in JP-A-3-214474.

SUMMARY OF THE INVENTION

The invention disclosed in JP-A-64-48276 has the following problems. That is, as will be understood from the example of the servo pattern shown in FIG. 4, in the servo pattern, the relative positional relation between tracks is important. For example, there is a problem such that when a relative positional deviation occurs between a clock reproducing head and a data recording head for writing a servo pattern due to a vibration or the like of a mechanism system of a magnetic disk drive, the phase of servo pattern is deviated between the tracks, so that not only a signal output level upon reproduction decreases but also a waveform is deformed and a linearity in the track direction of a position signal and sensitivity characteristics are deteriorated. There is also a problem such that it is necessary to individually provide a dedicated clock head, so that there is a limitation on designing of the apparatus and the manufacturing costs rise and the like.

According to the invention disclosed in JP-A-3-73406, since the servo pattern is recorded by a dedicated servo writer, the vibration of the mechanism system can be reduced and a phase precision of the servo signal between the tracks as mentioned above can be improved. There is, however, a problem such that when a plurality of single disks on which servo patterns have been recorded are mounted into a magnetic disk drive, a decentering or eccentricity occurs in each disk or the like.

According to the invention disclosed in JP-A-3-214474, the above problem of the decentering is eliminated by again writing the servo pattern. However, there is a problem such that since the head is positioned by a single head, there occurs an influence by the vibration of the positioning head or a fluctuation of the position signal which is caused depending on the disk surface. There is also a problem such that a productivity of the apparatus for recording a servo pattern onto the disk is deteriorated by the realization of a high track density and the decrease in number of disk units.

It is an object of the invention to provide a method for writing servo signals onto a magnetic disk in which the above problems of the conventional techniques are eliminated and a magnetic disk drive which uses the method of writing servo signals (patterns).

Another object of the invention is to provide a method for writing servo signals in which in the recording of a servo pattern in a magnetic disk drive, the servo pattern which doesn't cause a phase deviation between tracks and a decentering in a disk can be recorded and disadvantages such as limitation on designing of the apparatus and increase in manufacturing costs and the like which are caused by individually providing a dedicated clock head can be eliminated and is also to provide a magnetic disk drive which uses the method for writing servo signals.

Still another object of the invention is to provide a magnetic disk drive which can record a servo pattern which permits a phase detection which is ideal as a servo pattern for magnetic disk drives.

According to one aspect of the invention, there is provided a method for writing servo signals, which is made up of a first step of mounting a magnetic disk on which a clock signal has been recorded in at least a part of the disk into a magnetic disk drive, a second step of reading out a clock signal from said magnetic disk by using a recording/reproducing magnetic head, and a third step of recording a servo pattern on the basis of the read-out clock signal by using the recording/reproducing magnetic head.

According to another aspect of the invention, there is provided a magnetic disk drive which is made up of a magnetic head for recording/reproducing data onto/from a magnetic disk, the magnetic disk on which a clock signal has been recorded in at least a part of the disk, write clock generating means for forming and generating a recording clock on the basis of the clock signal read out through the magnetic head, servo pattern generating means for generating a servo pattern on the basis of the recording clock which is generated from the write clock generating means and a predetermined pattern, and writing means for writing the servo pattern onto the magnetic disk through the magnetic head.

According to still another aspect of the invention, the magnetic disk features that the clock signal which is used when the servo pattern is recorded onto the magnetic disk, namely, the clock signal whose phase is matched with respect to the radial direction of the magnetic disk has been recorded in at least a part of the magnetic disk.

According to further another aspect of the invention, the servo signal writing method is made up of a first step of mounting a magnetic disk on which a clock signal and another clock signal for position detection have been recorded, a second step of extracting a position signal from the disk by using a magnetic head for recording/reproducing data and for positioning a head by the position signal, and a third step of newly recording a servo pattern on the basis of the clock or another clock extracted from the disk.

According to still another aspect of the invention, it becomes possible to perform ideal phase detection by using, as a servo pattern of a magnetic disk mounted in a magnetic disk drive, a part of clocks recorded on the magnetic disks.

According to the invention, since the clock signal has been recorded on the magnetic disk, a separate head only for reproducing the clock is unnecessary. Since the head to reproduce the clock and the head to record the servo signal are the same head or are separate heads located on the same carriage, a phase deviation between tracks of the servo signal which is caused because the dedicated clock reproducing head and the servo signal writing head are away from each other as in case of providing a dedicated head only for reproducing the clock doesn't occur. Since the servo signal is recorded with a magnetic head being mounted in a magnetic disk drive, a decentering of the magnetic disk which occurs when the disk on which the servo information has already been recorded is installed doesn't occur as well.

On the other hand, since two kinds of clock patterns which are previously recorded are patterns which are continuous from the outer track to the inner track, there is no need to write the signal at the same track pitch as one for the magnetic disk drive. Therefore, the productivity is improved and the position detection can be performed by the complete phase detection, so that a fluctuation in position signal which is caused due to disks such as a medium variation or the like is also suppressed.

DESCRIPTION OF THE PREFERRED EMBODIMENTS

A preferred embodiment of the present invention will now be described hereinbelow with reference to the drawings. In all of the drawings, similar reference numerals are designated to the similar component elements.

Figure 1:
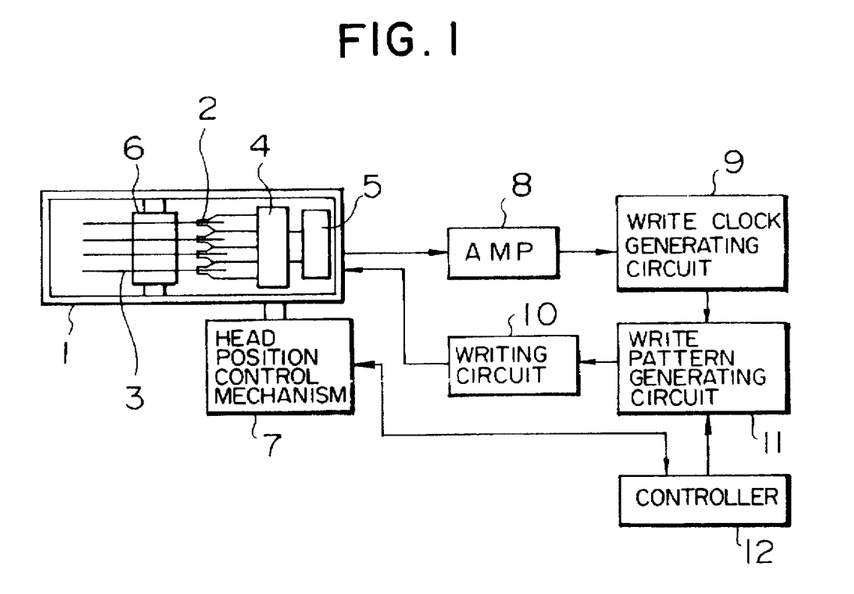
FIG. 1 is a block diagram showing a construction of a magnetic disk drive according to an embodiment of the present invention.

FIG. 1 is a block diagram showing a schematic construction of a magnetic disk drive according to an embodiment of the invention in which servo information is recorded to an HDA (head disk assembly) of a rotary actuator by using a magnetic disk on which a clock signal has been recorded. The clock signal is a signal which has already been written onto the magnetic disk by a dedicated clock writer, which will be explained hereinafter, and whose phase is matched in the radial direction of the magnetic disk.

In the embodiment shown in FIG. 1, reference numeral 1 denotes an HDA; 2 a magnetic head; 3 a magnetic disk; 4 a carriage; 5 a VCM (voice coil motor); 6 a spindle; 7 a head position control mechanism; 8 an amplifier (AMP); 9 a write clock generating circuit; 10 a writing circuit; 11 a write pattern generating circuit (or servo pattern generating circuit); and 12 a controller. According to the embodiment, unlike the conventional techniques, a dedicated clock head is not provided.

The operation of the embodiment shown in FIG. 1 will now be described. The magnetic head 2 reproduces the clock signal which has already been recorded. The reproduced clock signal is amplified by the amplifier (AMP) 8. The write clock generating circuit 9 generates a recording clock for recording a servo pattern. On the basis of the recording clock which is generated from the write clock generating circuit 9 and a pattern which is generated from the controller 12, the write pattern generating circuit 11 generates a servo pattern to be written onto the magnetic disk 3 and records the servo pattern onto the magnetic disk 3 through the writing circuit 10. The magnetic head 2 is subsequently moved by the head position control mechanism 7 and the above processes are repeated. The head position control mechanism 7 also has a length measuring function when moving the magnetic head 2.

Figure 2:
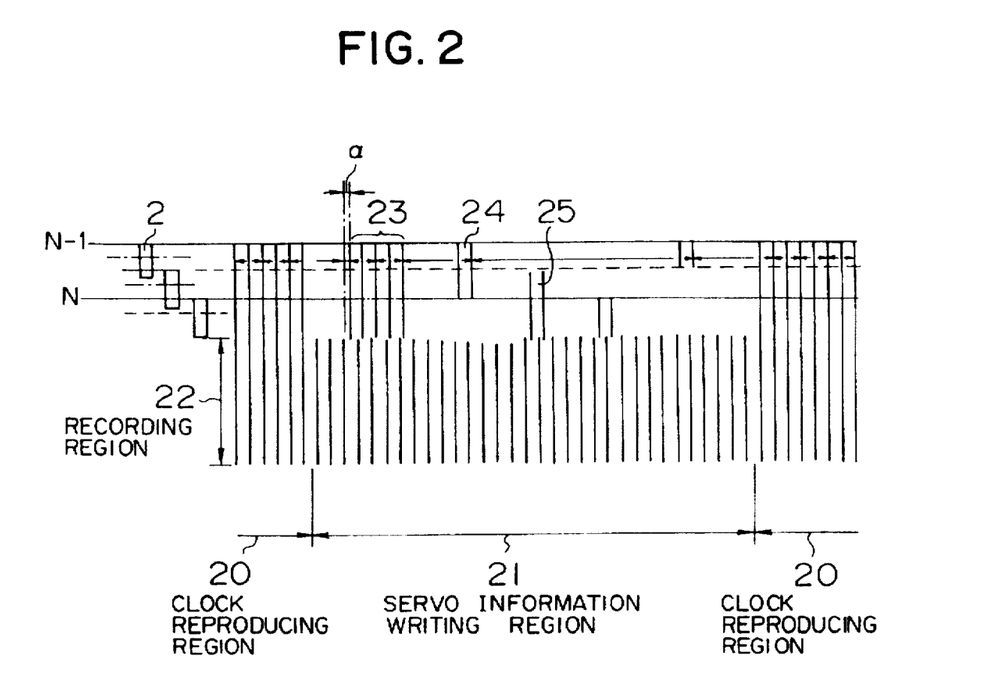
FIG. 2 is a diagram showing the magnetic disk surface on which servo information has been recorded in a part thereof in the embodiment shown in FIG. 1.

FIG. 2 shows the magnetic disk surface on which servo information has been recorded in a part thereof. In FIG. 2, reference numeral 2 denotes the magnetic head 2; 20 a clock reproducing region; 21 a servo information writing region; 22 a recording region (not yet recorded); 23 a sync signal; and 24 and 25 position signals.

FIG. 2 merely shows one portion in the clock reproducing region 20 and one portion in the servo information writing region 21. However, the clock reproducing region 20 and servo information writing region 21 are separated in the circumferential direction of the magnetic disk. The servo information region 21 is repetitively recorded at predetermined periods. The clock reproducing regions 20 and servo information writing regions 21 are generally arranged so as to equivalently or equally divide the circumference of the magnetic disk 3. As shown in FIG. 2, a method of intermittently recording the servo information onto the magnetic disk surface is called a sector servo method.

Among servo patterns shown in FIG. 4, the servo pattern shown in FIG. 2 shows a state in which the tracks (N−1) and (N) have been recorded. As will be understood from the diagram, the position signals 24 and 25 and the like are recorded so as to keep the phase relation with the adjacent servo pattern while being partially overwritten in the track width direction.

Note that in the sector servo method, the phases of the sync signal 23, position signals 24 and 25, and the like mentioned above don't need to be matched with the phase of the clock signal which has already been recorded (signal recorded in the recording region 22). ($\alpha \neq 0$ in FIG. 2)

This is because, as shown in the diagram, the clock reproducing region 20 and the servo information writing region 21 can be separated. Therefore, in the case of the method of recording servo patterns onto the whole surface, it is necessary to match the phases ($\alpha=0$).

Now, the case of recording servo patterns onto all of the surfaces of disks in an apparatus in which a plurality of disks were stacked will now be described. To raise a recording efficiency, the servo patterns are simultaneously recorded by a plurality of heads on the basis of a clock of a specific head. In the case where the servo patterns cannot be recorded simultaneously, they are sequentially recorded every head. In this case, however, the clock can be recorded on the basis of the clock of a specific head or the clock is detected every head and can be also recorded on the basis of the detected clock. A method of aligning skews in the latter case will now be described.

In case of recording servo patterns, the start positions must be certainly coincide irrespective of the radial position. Therefore, a special pattern of the same phase at an arbitrary radial position is recorded in the clock signal at only one position per circumference and an index signal is formed on the basis of the result of the discrimination of such a special pattern. When indices are formed individually for a plurality of disks, skews occur among the disks at random. Therefore, such an index is used for only the magnetic disk surface onto which data is to be first recorded and the index of the first recorded magnetic disk surface is used for the other remaining disk surfaces. That is, even when there is an index pattern on each magnetic disk, it is not used as an index. With such a construction, it is sufficient to use the same pattern when the clocks are recorded onto the magnetic disks and a producing efficiency is improved.

A method for detecting the position signal from the clock signal and positioning by the HDA (head disk assembly) and recording servo patterns will now be described.

Figure 5:
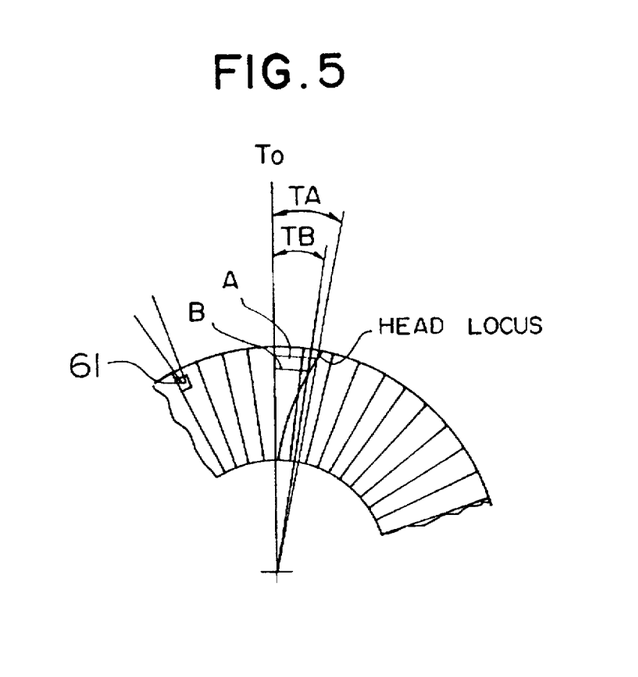
FIG. 5 is a diagram showing the relation between the head locus and the recorded clock.

FIG. 5 shows the relation between the head locus in a rotary actuator and the clock which has already been recorded. The clocks have been recorded by a linear actuator and is directed toward the center. The locus of the head of the HDA has an arc-like shape as shown in the diagram because of the rotary actuator. Therefore, among the clocks on the disk which is rotated at a constant rotational speed, a phase difference occurs in dependence on the radial position of the head. For example, at radial positions A and B, there is a relation of TA>TB, wherein TA and TB represent time differences from a reference position To to respective magnetic heads at positions A and B, respectively. Therefore, by measuring the values of TA and TB, the radial position can be determined. To measure TA and TB, a fixed head 61 is provided, a reference clock is formed, and a phase difference is measured relative to the reference clock. For example, assuming that a frequency of the clock is set to 8 MHz (4500 r.p.m.), a period of the clock is equal to 125 nsec. In this instance, 1 nsec at the inner trac1 (yaw angle is set to about 5°) corresponds to about 0.15 μm when calculating as a position in the radial direction.

Figure 6:
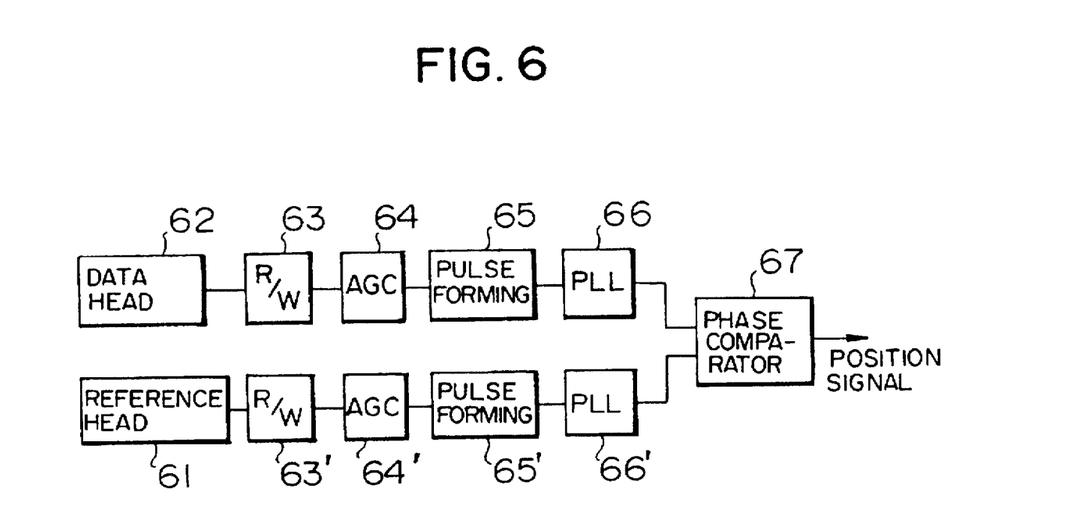
FIG. 6 is a block diagram of a circuit to detect a position signal by detecting the phase of clock signal.

FIG. 6 is a block diagram of an apparatus for executing the above-mentioned phase detection. Clock signals from a data head 62 and the reference head 61 are detected by R/W preamplifiers 63 and 63' and amplified to predetermined amplitudes by AGC (automatic gain controllers) 64 and 64'. The amplified signals are converted into the pulses by pulse forming circuits 65 and 65' and clock signals which trace a fluctuation in rotation or the like are generated by PLL (phase locked loops) 66 an 66", respectively. By detecting a phase difference between the clocks of the data head-and reference head by a phase comparator 67, thereby detecting the position signal.

A method of detecting the position from a clock disk without using the reference clock will now be described.

Figure 7:
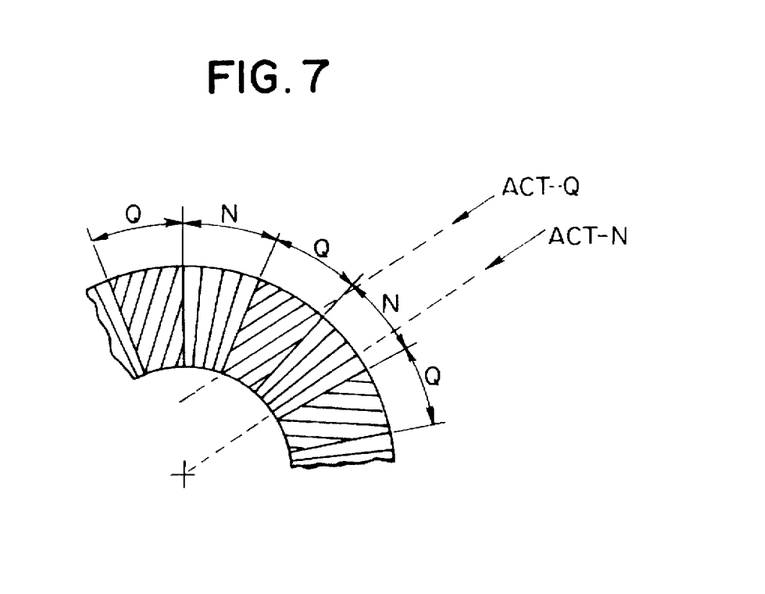
FIG. 7 is a diagram showing a clock disk in which the position can be also detected.

FIG. 7 shows a clock disk in which the position detection can be also performed. For example, the clock disk is constructed in a manner such that two actuators (ACT-N, ACT-Q) are arranged as shown in the diagram and clocks are alternately recorded and formed in a time sharing manner. The position in the radial direction is detected by detecting a phase difference of the clocks in the N and Q regions.

Figure 8:
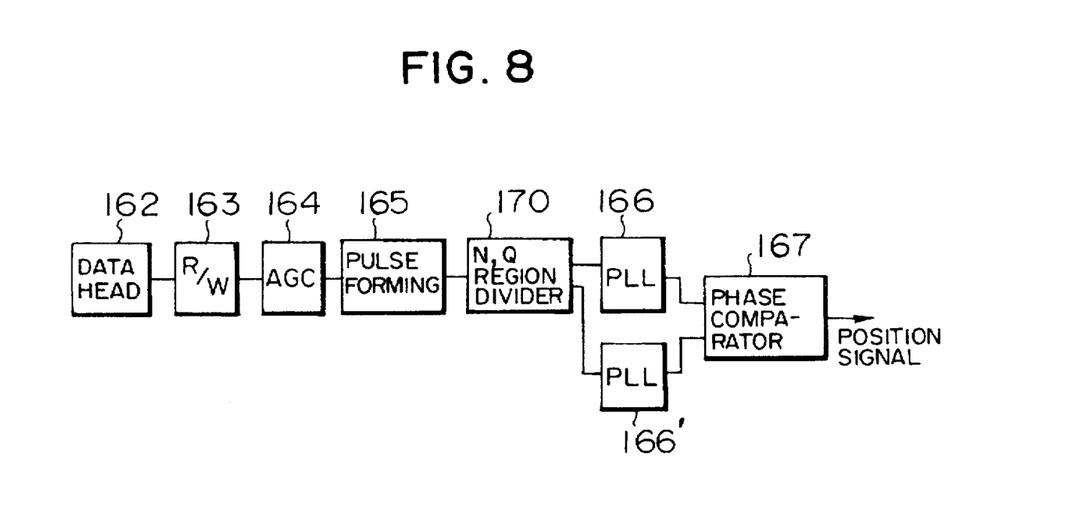
FIG. 8 is a block diagram of a circuit to detect a position signal from the clock disk of FIG. 7.

FIG. 8 shows a block diagram of an apparatus for detecting a phase difference. In a manner similar to FIG. 6, a clock is detected from a data head 162 by an R/W preamplifier 163 and is amplified to a predetermined amplitude by an AGC 164 and is converted into a pulse by a pulse forming circuit 165. After that, the pulse signal is divided into N and Q regions by an NQ region divider 170 and PLL 166 and 166' are constructed for the N and Q regions, respectively. Since no signal is derived in the Q region from the PLL 166 of the N region, an oscillating frequency is held in the Q region although not shown. The PLL 166' of the Q region is also similarly constructed. As mentioned above, the continuous clocks of the N and Q regions are formed and a continuous position signal is detected by a phase comparator 167.

A method whereby a clock disk is mounted into the HDA and servo signals are recorded on the basis of the clock disk will now be described with reference to FIG. 9.

Figure 9:
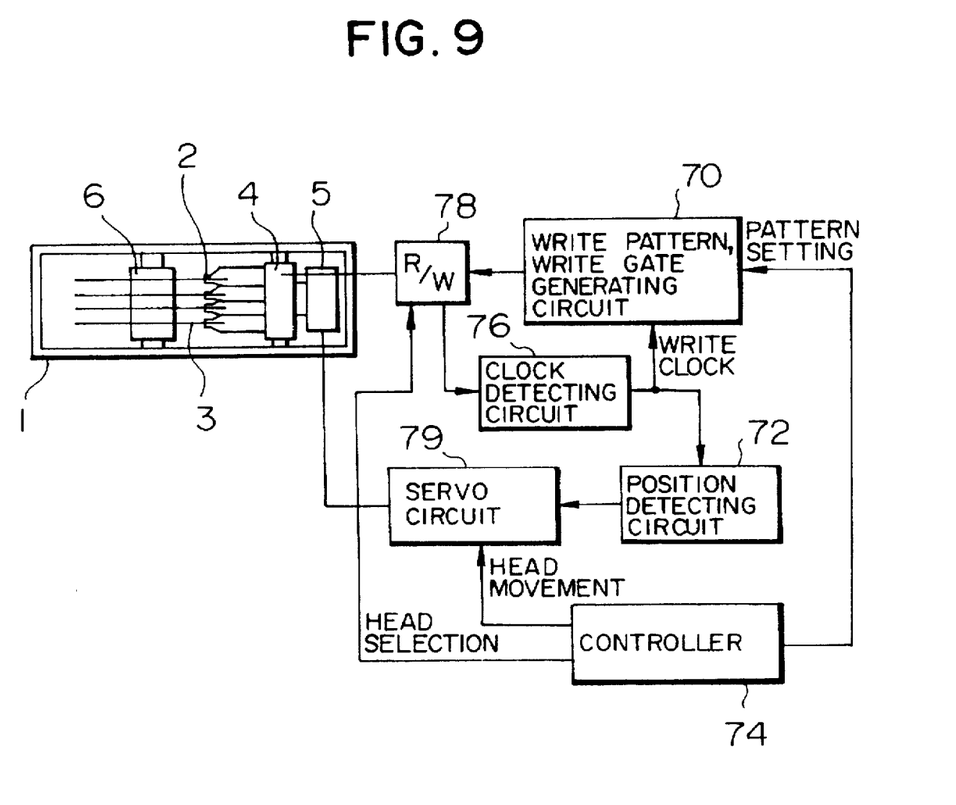
FIG. 9 is a diagram showing a construction of a magnetic disk drive according to another embodiment of the invention.

FIG. 9 is a block diagram showing a construction of a magnetic disk drive according to another embodiment of the invention made up of the HDA 1; a pattern & gate generating circuit 70 to record a servo pattern; a position detecting circuit 72 as mentioned above; a controller 74 to control the head switching, head movement, write pattern setting, and the like; and a clock detecting section 76. An IC 78 for writing/reading (R/W IC 78) and a servo circuit 79 are component parts of the HDA 1. A position detecting head is selected by the controller 74, the position is detected by detecting the clock of the position detecting head, and the head is positioned at a specific position by the servo circuit 79. The controller 74 sets the servo pattern according to the position and generates a write pattern and a write gate at proper timings and records a servo pattern onto the disk. In this instance, the selection of the recording head is set by the controller 74. However, according to the magnetic disk drive, the servo patterns can be also simultaneously recorded by a plurality of heads. In order to improve the recording precision, it is also possible to set all of the disks which are installed into the HDA 1 to the clock disks and to select the position detecting head every recording surface. The servo patterns are intermittently recorded on the data surface. For example, the servo pattern is recorded in a part of the boundary portion of the N and Q regions in FIG. 7.

Figure 10:
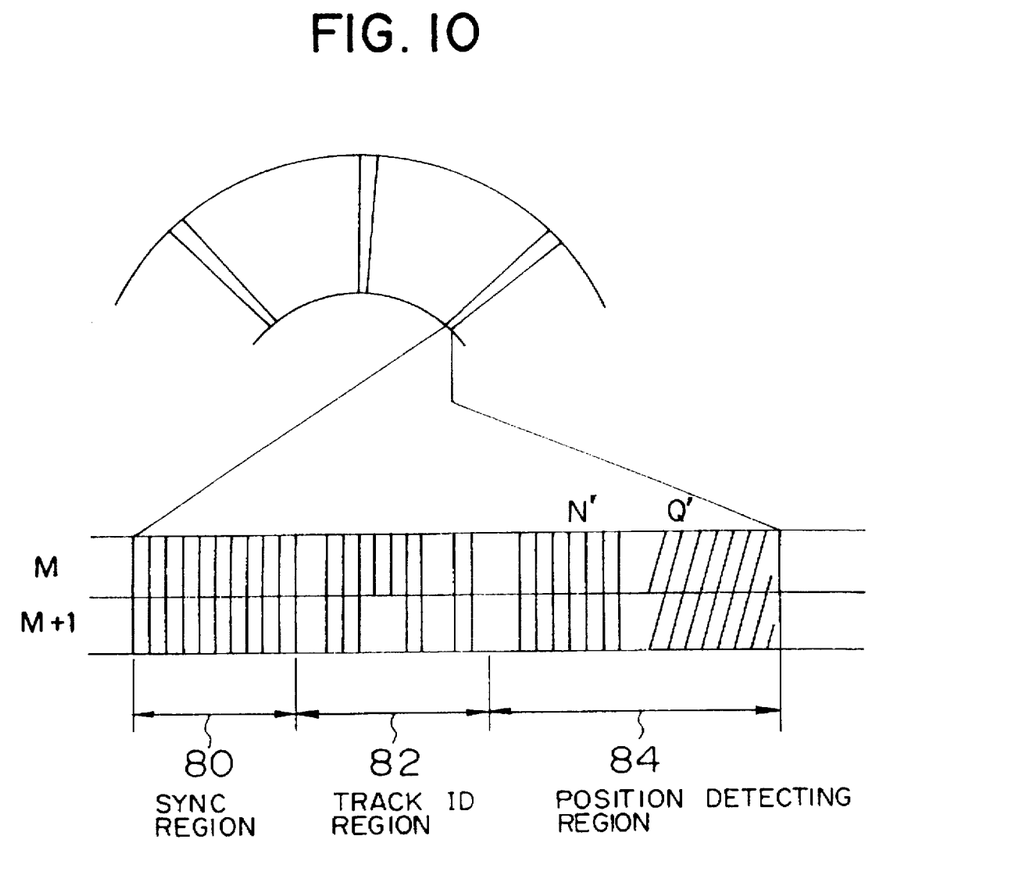
FIG. 10 is a diagram showing an example of a construction of a servo region on a magnetic disk.

FIG. 10 shows an example of a construction of servo regions of the tracks (M) and (M+1). The servo region is divided into a sync region 80, a track ID region 82, and a position detecting region 84. The sync region 80 is a region to form a gate signal to decide an AGC gain adjustment and region. The track ID region 82 is a region in which a special pattern indicative of the track number has been recorded. The position detecting region 84 is a region indicative of the position in a range between a few tracks. In the diagram, although the position detecting region 84 is based on a phase detecting method, an amplitude detecting method can be also used. N' and Q' regions in FIG. 10 correspond to the N and Q regions in FIG. 7. However, data is not rerecorded in the Q' region. The reason why the data in the N' region is rerecorded is to eliminate an eccentricity or decentering which is caused when the disk is mounted into the HDA. The reason why the data of the Q' region is left is because the signal which is continuous in the radial direction cannot be recorded into the regions other than the N' region in the HDA. However, the data in the Q' region can be also falsely rewritten. Any one of the N and Q regions in FIG. 7 can be used as a Q' region.

A dedicated clock writer will now be described. Although the clock writer has almost the same function as a conventional servo writer, it is used to write a simple pattern for the clock signal and an index pattern. Since a frequency of the clock writer can be also suppressed to a value lower than that of the servo writer, the clock writer can be more simply constructed.

Figure 3:
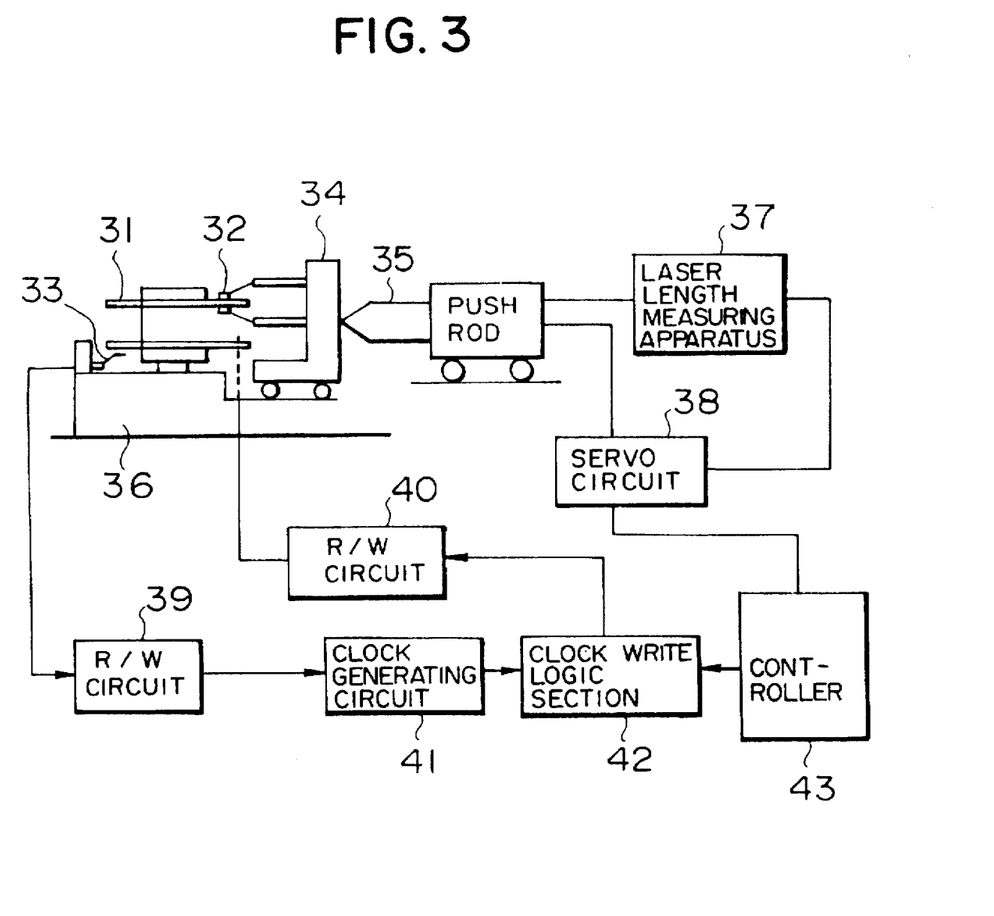
FIG. 3 is a block diagram showing a construction of a clock writer which is used in the invention.

FIG. 3 is a block diagram showing a schematic construction of the clock writer. In FIG. 3, reference numeral 31 denotes a magnetic disk; 32 a magnetic head; 33 a dedicated clock head; 34 a carriage; 35 a push rod; 36 a base; 37 a laser length measuring apparatus; 38 a servo circuit; 39 and 40 reading/writing circuits; 41 a clock generating circuit; 42 a clock write logic section; and 43 a controller. FIG. 4 shows a construction of a linear actuator. However, it can be also applied to a rotary actuator. However, in case of the linear type, there is no need to consider the rotational radius of the head or the like in the magnetic disk drive as in the rotary type, the linear actuator can be easily commonly used among apparatuses. On the other hand, when the magnetic disk on which data has been recorded by the linear type clock writer is installed to the rotary type apparatus, a limitation occurs in the recording density because the magnetic head and the recorded pattern have azimuths (azimuth denotes an angle on the magnetic disk surface which is formed between the direction of the magnetic head and the tangential direction of the disk on which the magnetic head is located). Such a limitation, however, doesn't cause a large problem in general.

The clock writer shown in FIG. 3 simultaneously records the clocks onto both surfaces of the magnetic disk 31 by using the dedicated head 32 of a wide track width. It will be obviously understood that a plurality of magnetic disks 31 can be used.

The operation of the clock writer shown in FIG. 3 will now be described. By the operation of the reading/writing circuit 39, the clock generating circuit 41 generates a clock for recording on the basis of a signal read out from the dedicated clock head 33. On the other hand, a pattern instruction which is generated from the controller 43 is shaped to a pattern synchronized with the clock which is generated from the clock generating circuit 41 by the clock write logic section 42 and is sent to the reading/writing circuit 40. The pattern synchronized with the clock sent to the reading/writing circuit 40 is written onto the magnetic disk 31 by the head 32.

On the other hand, the push rod 35 is a mechanism to send the head 32 and has the servo circuit 38 and the laser length measuring apparatus 37 and constructs a servo system using the laser length measuring apparatus 37 as a reference. According to the position control system, it is not always necessary to position every track and by recording while feeding the head at a constant speed, the recording time can be reduced.

To record data onto the clock disk in FIG. 7, two heads whose moving directions are different for the center of the disk are needed. However, as shown in FIG. 7, two heads of N and Q can be also installed on the same carriage and data can be recorded by those heads. Or, another carriage corresponding to the carriage 34 is also provided and the direction can be also changed. The rotary type carriage can be also used.

According to the embodiment, since the clock signal to record the servo pattern has already been recorded on the magnetic disk, when the servo pattern is recorded onto the magnetic disk, there is no need to attach the dedicated clock head to the magnetic disk drive, so that a degree of freedom on designing is improved. Since the magnetic head to record the servo signal and the magnetic head to read out the clock signal are the same head or are separate ones both located on the same carriage, a recording precision of the servo pattern is improved. In the magnetic disk drive, since the servo pattern is recorded, there is an effect such that an eccentricity or decentering is not caused or the like. Since the position can be also detected from the clock disk, the servo pattern can be also recorded by merely connecting an external circuit to the HDA. In this case, since the phase can be perfectly detected, the position signal of high position quality and precision are obtained without being influenced by a medium variation or the like. A construction of the dedicated clock writer can be simplified as compared with a conventional servo writer, a productivity of the magnetic disk on which the clock signal has been written is also improved, and the dedicated clock writer can be also commonly used among the apparatuses, so that there is also an advantage of the decrease in costs.

As will be obviously understood from the above description, according to the invention, in the recording of the servo pattern in the magnetic disk drive, it is possible to record the servo pattern in which a positional deviation between the tracks and a decentering of the magnetic disk are not caused. The disadvantages such as limitation on designing of the apparatus, increase in manufacturing costs, and the like which are caused by separately providing the dedicated clock head can be eliminated.

Since the position detection from the clock disk is not influenced by a medium variation or the like, the writing precision when recording the servo signals in the HDA is improved. When the servo signal is recorded, by leaving a part of the clocks, a perfect phase detection pattern without an eccentricity or decentering can be also formed in the HDA.

What is claimed is:

1. A method for writing servo signals, comprising the steps of:

mounting a magnetic disk on which a clock signal has been recorded in at least a part thereof into a magnetic disk drive;

reading out the clock signal from said magnetic disk by using a data recording/reproducing magnetic head;

forming a recording clock on the basis of said read-out clock signal and detecting position information on said magnetic disk; and positioning the magnetic head on the basis of said position information and writing a servo pattern onto the magnetic disk on the basis of said recording clock;

wherein the detection of said position information includes executing a phase detection for a reference clock read out from a fixed head using said read-out clock signal.

2. A method for writing servo signals, comprising the steps of:

mounting a magnetic disk on which a clock signal has been recorded in at least a part thereof into a magnetic disk drive;

reading out the clock signal from said magnetic disk by using a data recording/reproducing magnetic head;

forming a recording clock on the basis of said read-out clock signal and detecting position information on said magnetic disk; and positioning the magnetic head on the basis of said position information and writing a servo pattern onto the magnetic disk on the basis of said recording clock;

wherein said clock signal recorded on the magnetic disk includes at least two kinds of clocks and said position information is obtained by detecting a phase difference from said two kinds of clocks.

3. A magnetic disk drive, comprising:

a magnetic disk mounted in the magnetic disk drive, said magnetic disk having a plurality of sector-shaped servo signal recording areas disposed in a circumferential direction of said magnetic disk, each sector-shaped servo signal recording area extending from inner-to-outer tracks and having a multiplicity of servo magnetization patterns recorded thereon, each servo magnetization pattern formed of a plurality of substantially continuous lines extending through said sector-shaped area, at least one of a part of and an area adjacent to said sector-shaped servo signal recording area being rewritten in a different servo magnetization pattern a, after said magnetic disk is mounted in said magnetic disk drive;

a magnetic head; and circuitry for generating a position signal from said servo magnetization patterns which have been recorded in said magnetic disk and said servo magnetization pattern which is rewritten in said magnetic disk by said magnetic head.

* * * * *